(No Model.)
D. W. MATSLER.
CORN PLANTER ATTACHMENT.
No. 539,282. Patented May 14, 1895.
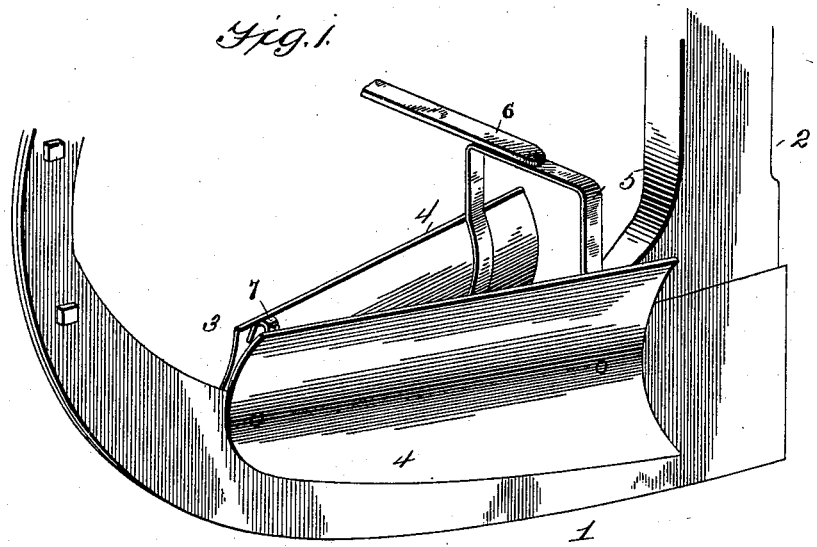
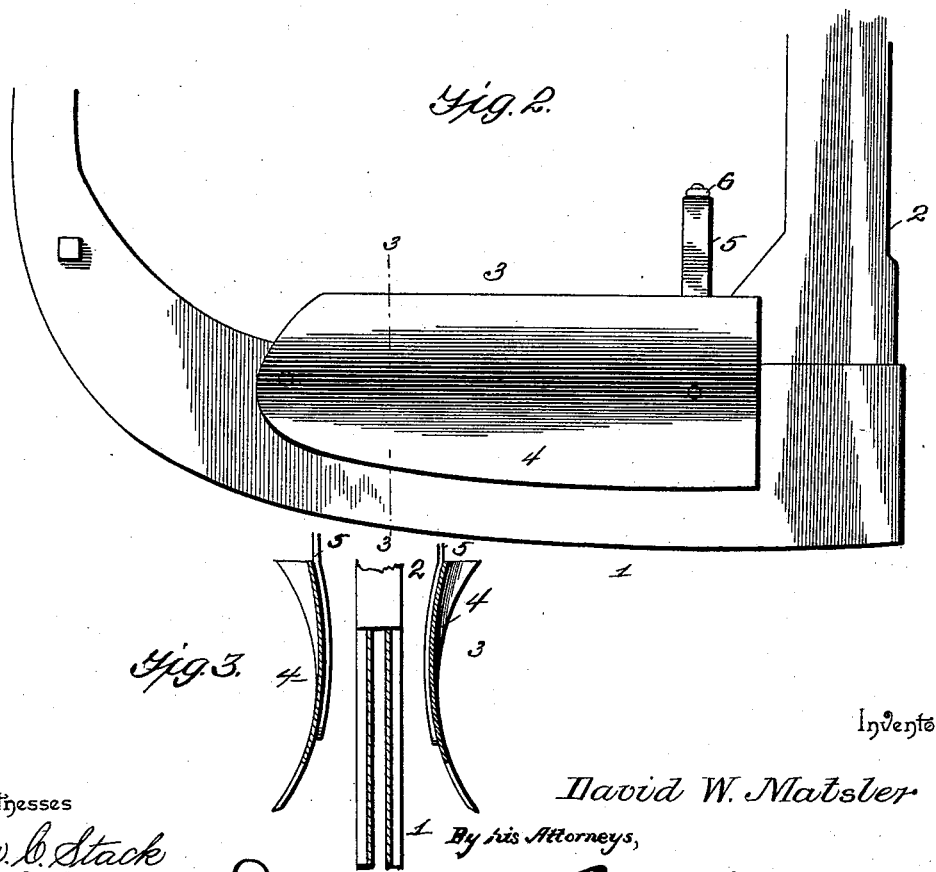
Witnesses
Jos. C. Stack
Inventor
David W. Matsler
By his Attorneys,
C. A. Snow & Co.

UNITED STATES PATENT OFFICE.

DAVID W. MATSLER, OF CHANUTE, KANSAS.

CORN-PLANTER ATTACHMENT.

SPECIFICATION forming part of Letters Patent No. 539,282, dated May 14, 1895.

Application filed February 15, 1895. Serial No. 538,557. (No model.)

*To all whom it may concern:*

Be it known that I, DAVID W. MATSLER, a citizen of the United States, residing at Chanute, in the county of Neosho and State of Kansas, have invented a new and useful Corn-Planter Attachment, of which the following is a specification.

My invention relates to an attachment for corn planters, and particularly to a furrow opening device for use in connection with furrow opening shoes, the objects in view being to provide lateral deflecting wings adapted to be attached to a shoe and having downwardly inclined cutting edges.

Further objects and advantages of the invention will appear in the following description, and the novel features thereof will be particularly pointed out in the appended claims.

In the drawings, Figure 1 is a perspective view of an attachment embodying my invention applied in the operative position to a furrow-opening shoe. Fig. 2 is a side view of the same. Fig. 3 is a transverse section on the line 3 3 of Fig. 2.

Similar numerals of reference indicate corresponding parts in all the figures of the drawings.

1 designates a furrow opening shoe of the ordinary or any preferred construction adapted for use in connection with a planter, and having at its rear end a seed chute 2, and 3 represents the attachment embodying my invention, the same consisting, essentially, of twin deflecting blades or wings 4 secured at their front ends to the shoe 1, near the front end of the latter, and connected near their rear ends by an arch 5. The lower edges of the blades or wings are disposed approximately parallel with the lower or cutting edge of the shoe, and above the same to cause the lower edges of the blades or wings to cut to a less width than the shoe. Furthermore, the wings or blades are cross-sectionally concavo-convex, the concave surfaces being outward, while the convex surfaces are arranged inward or toward the shoe. The concavity of the wings or blades is increased toward the rear ends thereof, as will be seen by reference to Figs. 1 and 3, in order to cause the lower or cutting edges thereof to cut laterally or from the machine.

The extremities of the connecting arch are bolted to the inner surfaces of the wings or blades near their rear ends, and the arch which connects one pair of the wings or blades is adapted to be connected with a corresponding arch, not shown, by means of a cross bar 6. An arch 7 is also arranged between the front ends of the blades to stiffen the same and prevent inward bending due to the side pressure of the soil.

The operation of the attachment is to throw the soil laterally or from the shoe after said shoe has first entered the soil and marked the center of the furrow, and owing to the peculiar cross-sectional construction of the wings or blades the efficiency of the furrow opening device is materially increased.

From the foregoing description, it will be seen that the device is so constructed as to open a furrow wide enough to admit the wheel of a planter and insure the depositing of the seed at a proper depth in a suitable bed where it may become well rooted, and at the same time the wings do not materially affect the draft of the machine.

It will be understood that various changes in the form, proportion, and the minor details of construction may be resorted to without departing from the spirit or sacrificing any of the advantages of this invention.

Having described my invention, what I claim is—

1. The combination with a furrow opening shoe, of twin blades or wings secured at their front ends to the shoe adjacent to its front extremity, having lower cutting edges which lie above the plane thereof, said wings or blades being deflected toward their rear ends and being cross-sectionally concavo-convex with the concavity increasing in depth toward their rear ends, and a connection between the ends of the wings or blades, substantially as specified.

2. The combination with a furrow opening shoe, of twin blades or wings secured at their front ends to the shoe adjacent to its front extremity, having lower cutting edges which lie substantially parallel with the cutting edge of the shoe and above the plane thereof, said wings or blades being deflected toward their rear ends and being cross-sectionally concavo-convex with the concavity increasing in depth toward their rear ends, and arches connecting the rear ends of the wings or blades and bolted thereto, substantially as specified.

In testimony that I claim the foregoing as my own I have hereto affixed my signature in the presence of two witnesses.

DAVID W. MATSLER.

Witnesses:
ALEX. BAIRD,
JOHN P. WRIGHT.